(12) United States Patent
Reuter et al.

(10) Patent No.: US 8,420,671 B2
(45) Date of Patent: Apr. 16, 2013

(54) STABILISED THIOPHENE DERIVATIVES

(75) Inventors: Knud Reuter, Krefeld (DE); Klaus Wussow, Netphen (DE); Udo Merker, Köln (DE); Andreas Elschner, Mülheim (DE)

(73) Assignee: H.C. Starck Clevios GmbH (DE)

( * ) Notice: Subject to any disclaimer, the term of this patent is extended or adjusted under 35 U.S.C. 154(b) by 160 days.

(21) Appl. No.: 12/894,952

(22) Filed: Sep. 30, 2010

(65) Prior Publication Data

US 2011/0102973 A1     May 5, 2011

(30) Foreign Application Priority Data

Sep. 30, 2009   (CN) .......................... 2009 1 0253042
Sep. 30, 2009   (EP) ..................................... 09012372

(51) Int. Cl.
    *A61K 31/4468*     (2006.01)
(52) U.S. Cl.
    USPC .......................................................... 514/316
(58) Field of Classification Search .................... 514/316
    See application file for complete search history.

(56) References Cited

U.S. PATENT DOCUMENTS

| 6,136,176 A | 10/2000 | Wheeler et al. |
| 6,334,966 B1 | 1/2002 | Hahn et al. |

FOREIGN PATENT DOCUMENTS

| CN | 1673310 A | 9/2005 |
| EP | 1154449 A2 | 11/2001 |
| EP | 1 860 111 A1 | 11/2007 |
| WO | WO-2008/055834 A1 | 5/2008 |

OTHER PUBLICATIONS

Bruno Fabre, Journal of the Electroformed Society, vol. 145, No. 12, Dec. 1998, pp. 4110-4119.

*Primary Examiner* — Taofiq A Solola
(74) *Attorney, Agent, or Firm* — Novak Druce Connolly Bove Lodge + Quigg LLP

(57) ABSTRACT

The present invention relates to a stabilized monomer composition comprising
    at least 50 wt.-%, based on the total weight of the stabilized monomer composition, of a thiophene derivative monomer having the general formula (I)

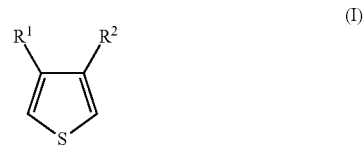

in which
    $R^1$ and $R^2$ stand, independently of one another, for hydrogen, for an optionally substituted $C_1$-$C_{20}$-alkyl group or $C_1$-$C_{20}$-oxyalkyl group, optionally interrupted by 1 to 5 oxygen atoms and/or sulfur atoms, or jointly for an optionally substituted $C_1$-$C_{20}$-dioxyalkylene group or $C_6$-$C_{20}$-dioxyarylene group,
and
    0.001 to 10 wt.-%, based on the total weight of the stabilized monomer composition, of a stabilizer.

The present invention also relates to a method for the manufacture of a capacitor, a capacitor obtained by this method, the use of a stabilized monomer composition and to the use of a stabilizer.

12 Claims, No Drawings

STABILISED THIOPHENE DERIVATIVES

The invention relates to a stabilized monomer composition, to a method for the manufacture of an electronic capacitor, an electronic capacitor obtained by this method, to the use of a stabilised monomer composition and to the use of a stabiliser.

Solid electrolytic capacitors with conductive polymers as the cathode materials to have been widely used in the electronics industry due to their advantageously low equivalent series resistance (ESR) and "non-burning/non-ignition" failure mode. Various types of conductive polymers including polypyrrole, polyaniline, and poly(3,4-ethyldioxythiophene) (PEDOT) are applied to electrolytic capacitors as a cathode material when valve metals such as Ta, Al, and Nb as well as conductive oxides such as ceramic NbO, are used as the anode. In a manufacturing process to produce conductive polymer based valve metal capacitors, Ta powder, for example, is mechanically pressed to form Ta metal pellets, which are subsequently sintered at high temperature under vacuum. The sintered pellets are anodized in an electrolyte solution to form a dielectric layer ($Ta_2O_5$) on the anode surface. Following that, multiple layers of a conductive polymer, such as poly 3,4-ethylenedioxythiophene (PEDOT), are laid down by a multiple dipping polymerization process. During the polymerization process, an oxidant solution, such as iron (III) p-toluenensulfonate solution in a solvent, is in some cases first applied onto the anodes. It is then followed by the application of a liquid monomer or monomer solution as disclosed by D Wheeler, et al in U.S. Pat. No. 6,136,176 and by R. Hahn, et al., in U.S. Pat. No. 6,334,966.

For the purpose of achieving high electrical conductivities in this connection, the purity of the thiophene derivatives monomers used for the preparation of the conductive polymer plays a crucial role. Ordinarily, distillation is used as a conventional purification process for thiophene derivatives.

As disclosed in EP 1 860 111 A1 thiophenes that have been purified in this way have a tendency in the course of storage towards changes in colour and/or the formation of undesirable secondary components, such as, for example, the formation of dimeric or trimeric thiophenes having the structures shown below. This results in considerable impairment of the properties of the polythiophenes prepared therefrom.

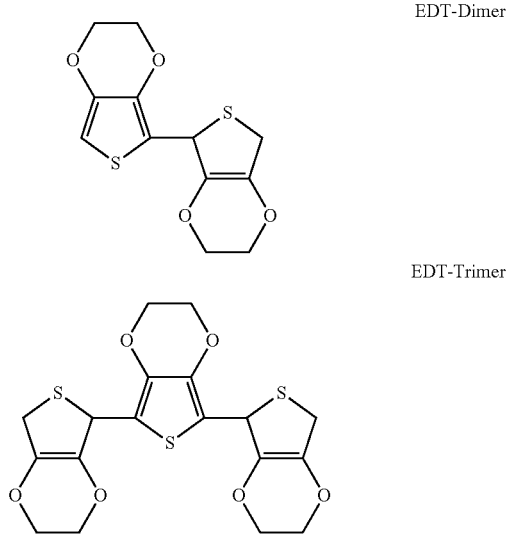

EDT-Dimer

EDT-Trimer

In order to avoid these negative effects of non-conjugated dimeric or trimeric thiophene derivatives, EP 1 860 111 A1 suggests to pre-treat the thiophene derivatives with alkaline materials which, before the monomer is used for forming a capacitor, is separated from the monomer, for example by filtration. Alternatively, both documents suggest passing the monomer solution through a basic anion exchange column.

Although by the method disclosed in EP 1 860 111 A1 the storage time of thiophenes can be significantly improved, the disadvantage of this method can be seen in the fact that, whenever the monomer is used, an extra step of pre-treating the monomer with the basic material has to be performed.

An object of the present invention is thus to reduce or even overcome the disadvantages of the state of the art.

In particular it is an object of the present invention to provide a stabilised monomer composition of a thiophene derivative that does not have to be pre-treated with an alkaline material, which subsequently has to be removed before the composition is used for the manufacture of an electronic capacitor.

It was furthermore an object of the present invention to provide a process for the manufacture of an electronic capacitor with reproducible low ESR-values which, compared to the processes disclosed in the prior art, requires fewer process steps.

A contribution to the solution of at least one of the above objects is provided by the subject matters of the category-forming independent principal and adjacent claims, whereby the therefrom dependent sub-claims represent preferred embodiments of the present invention, whose subject matters likewise make a contribution to solving at least one object.

The invention relates to a stabilised monomer composition, which is preferably a transparent solution, comprising
- at least 90 wt.-%, preferably at least 95 wt.-%, more preferably at least 97.5 wt.-% and most preferably at least 98.5 wt.-%, in each case based on the total weight of the stabilised monomer, of a thiophene derivative monomer having the general formula (I)

in which
$R^1$ and $R^2$ stand, independently of one another, for hydrogen, for an optionally substituted $C_1$-$C_{20}$-alkyl group or $C_1$-$C_{20}$-oxyalkyl group, optionally interrupted by 1 to 5 oxygen atoms and/or sulfur atoms, or jointly for an optionally substituted $C_1$-$C_{20}$-dioxyalkylene group or $C_6$-$C_{20}$-dioxyarylene group,
and
0.001 to 10 wt.-%, preferably 0.01 to 5 wt.-%, more preferably 0.05 to 2.5 wt.-% and most preferably 0.1 to 1.5 wt.-%, in each case based on the total weight of the stabilised monomer, of a stabiliser, which is preferably a radical scavenger, an amine or an UV/VIS-absorber.

Surprisingly, it has now been found that it is possible to stabilise thiophene derivatives by adding stabilisers such as radical scavengers, amines or UV/VIS-absorbers, which do not have to be removed prior to the use of the thiophene derivate for forming electronic capacitors. The person skilled in the art could not expect that the ESR of capacitors that have been formed by polymerizing thiophene derivatives in the presence of such stabilisers can be kept low in a reproducible manner. In this context it was particularly surprising that the formation of dimeric and trimeric thiophenes can be inhibited by the addition of stabilisers such as radical scavengers and UV/VIS-absorbers as it was known that the formation of these compounds is an acid catalyzed, ionic reaction.

Thiophene derivatives within the scope of the invention are preferably those having the general formula (II),

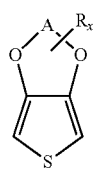

(II)

in which

A stands for an optionally substituted $C_1$-$C_5$-alkylene residue or a $C_6$-$C_{14}$-arylene residue, preferably for an optionally substituted $C_2$-$C_3$-alkylene residue, R stands for a linear or branched, optionally substituted $C_1$-$C_{18}$-alkyl residue, preferably a linear or branched, optionally substituted $C_1$-$C_{14}$-alkyl residue, an optionally substituted $C_5$-$C_{12}$-cycloalkyl residue, an optionally substituted $C_6$-$C_{14}$-aryl residue, an optionally substituted $C_7$-$C_{18}$-aralkyl residue, an optionally substituted $C_1$-$C_4$-hydroxyalkyl residue, preferably an optionally substituted $C_1$-$C_2$-hydroxyalkyl residue, or a hydroxyl residue, x stands for an integer from 0 to 8, preferably from 0 to 6, particularly preferably for 0 or 1, and in the case where several residues R are bonded to A, these may be the same or different.

The general formula (II) is to be understood in such a way that x substituents R equal or different may be bonded to the alkylene residue or arylene residue A.

Particularly preferred thiophene derivatives within the scope of the invention are those having the general formula (IIa)

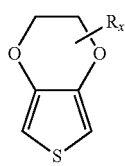

(IIa)

in which R and x have the significance stated for general formula (II).

In a preferred embodiment of the invention the thiophene derivative is 3,4-ethylenedioxythiophene.

$C_1$-$C_5$-alkylene residues A within the scope of the invention are methylene, ethylene, n-propylene, n-butylene or n-pentylene. $C_6$-$C_{14}$-arylene residues A within the scope of the invention may be, for example, phenylene, naphthylene or anthracenylidene. $C_1$-$C_{18}$ alkyl within the scope of the invention stands for linear or branched $C_1$-$C_{18}$-alkyl residues, such as, for example, methyl, ethyl, n-propyl, isopropyl, n-butyl, isobutyl, sec-butyl, tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadcyl or n-octadecyl. $C_1$-$C_{20}$-alkyl groups furthermore include, for example, n-nonadecyl and n-eicosyl. $C_5$-$C_{12}$ cycloalkyl within the scope of the invention stands for $C_5$-$C_{12}$-cycloalkyl residues, such as, for example, cyclopentyl, cyclohexyl, cycloheptyl, cyclooctyl, cyclononyl or cyclodecyl; $C_5$-$C_{14}$ aryl for $C_5$-$C_{14}$-aryl residues, such as, for example, phenyl or naphthyl; and $C_7$-$C_{18}$ aralkyl for $C_7$-$C_{18}$-aralkyl residues, such as, for example, benzyl, o-tolyl, m-tolyl, p-tolyl, 2,3-xylyl, 2,4-xylyl, 2,5-xylyl, 2,6-xylyl, 3,4-xylyl, 3,5-xylyl or mesityl. $C_1$-$C_{20}$ oxyalkyl within the scope of the invention stands for $C_1$-$C_{20}$-oxyalkyl residues, such as, for example, methoxy, ethoxy, n-propoxy, isopropoxy, n-butoxy, isobutoxy, sec-butoxy, tert-butoxy, n-pentyloxy, 1-methylbutyloxy, 2-methylbutyloxy, 3-methylbutyloxy, 1-ethylpropyloxy, 1,1-dimethylpropyloxy, 1,2-dimethylpropyloxy, 2,2-dimethylpropyloxy, n-hexyloxy, n-heptyloxy, n-octyloxy, 2-ethylhexyloxy, n-nonyloxy, n-decyloxy, n-undecyloxy, n-dodecyloxy, n-tridecyloxy, n-tetradecyloxy, n-hexadcyloxy, n-nonadecyloxy or n-eicosyloxy. The preceding list serves for exemplary elucidation of the invention and is not to be regarded as being definitive.

Numerous organic groups enter into consideration as optionally further substituents of the alkylene residues or arylene residues A; for example, alkyl, cycloalkyl, aryl, halogen, ether, thioether, disulfide, sulfoxide, sulfone, sulfonate, amino, aldehyde, keto, carboxylic-ester, carboxylic-acid, carbonate, carboxylate, cyano, alkylsilane, alkoxysilane and carboxylamide groups.

To the extent that the thiophene derivative exhibits one or more stereocentres, the thiophene derivative may be a racemate, an enantiomerically pure or diastereomerically pure compound, or an enantiomerically enriched or diastereomerically enriched compound. The expression "enantiomerically enriched compound" is to be understood to mean a compound with an enantiomeric excess (ee) of more than 50%. The expression 'diastereomerically enriched compound' is to be understood to mean a compound with a diastereomeric excess (de) of more than 30%. According to the invention, however, it may also be a question of an arbitrary mixture of diastereomers.

The thiophene derivatives having the general formula (I), (II), or (IIa) are capable of being prepared by processes known to a person skilled in the art. Such a preparation process is described in EP-A-1 142 888, for example.

The stabilised monomer composition according to the present invention comprises, besides the previously described thiophene derivative, a stabiliser. As a "stabiliser" in the sense of the present invention it is understood a compound that inhibits the formation of dimeric or trimeric thiophene derivatives in the monomer during storage of the monomer, especially when the monomer is exposed to UV/VIS-light.

According to a first preferred embodiment of the stabilised monomer composition according to the present invention the stabiliser may be a radical scavenger.

As a "radical scavenger" in the sense of the present invention it is understood a compound that, when reacting with a radical, forms a reaction product that is less reactive than the radical with which the compound has reacted.

According to a preferred embodiment of the stabilised monomer composition according to the present invention, in which the stabiliser is a radical scavenger, the stabiliser may be a so called "HALS" ("Hindered amine light stabilizer").

In this context, the radical scavenger may have a chemical structure comprising at least one structural element having the general formula (III)

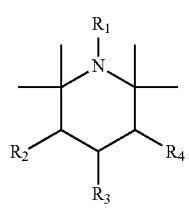

in which
R$_1$ stands for a hydrogen atom, a hydroxyl group, a linear or branched C$_1$-C$_{18}$-alkyl residue or a linear or branched C$_1$-C$_{18}$-alkoxy residue, wherein a hydrogen atom, a methyl group or a H$_{17}$C$_8$—O-group are especially preferred as residues a R$_1$, and
R$_2$, R$_3$ and R$_4$ stand, independently of one another, for a hydrogen atom or an organic residue.

In context with this preferred embodiment of the stabilised monomer composition according to the present invention, the radical scavenger may have a chemical structure comprising of the general formula (IV)

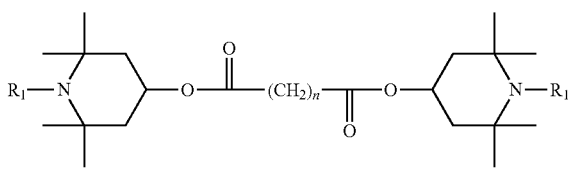

in which R$_1$ is a residue having the significance stated before and n is an integer ranging from 2 to 20, wherein a hydrogen atom, a methyl group or a H$_{17}$C$_8$—O-group are especially preferred as residues a R$_1$ and wherein the value of n is preferably within the range from 6 to 10, a value for n of 8 being most preferred. Examples of appropriate radical scavengers that can be mentioned in this context are the products Tinuvin®123, Tinuvin®292, Tinuvin®765 and Tinuvin®770 DF which can be obtained from Ciba AG, Basel, Switzerland.

In context with this preferred embodiment of the stabilised monomer composition according to the present invention, the radical scavenger may also have a chemical structure comprising of the general formula (V)

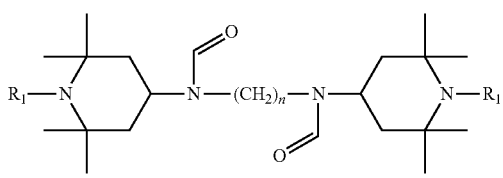

in which R$_1$ is a residue have the significance stated in claim 5 and n is an integer ranging from 2 to 20, wherein a hydrogen atom, a hydroxyl group, a methyl group or a H$_{17}$C$_8$—O-group are especially preferred as residues a R$_1$ and wherein the value of n is preferably within the range from 4 to 8, a value for n of 6 being most preferred. An example of an appropriate radical scavenger that can be mentioned in this context is the product Uvinul®4050 H from BASF AG, Ludwigshafen, Germany.

According to another preferred embodiment of the stabilised monomer composition according to the present invention, in which the stabiliser is a radical scavenger, the stabiliser may be a phenol derivative, for example a sterically hindered phenol derivative, a brenzcatechin derivative or a hydrochinone derivative.

In context with this preferred embodiment of the stabilised monomer composition according to the present invention, the radical scavenger may have a chemical structure comprising at least one structural element having the general formula (VI)

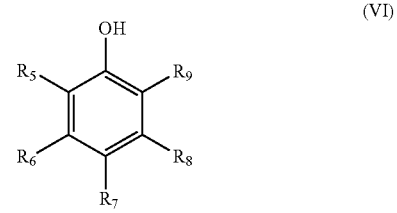

in which R$_5$, R$_6$, R$_7$, R$_8$ and R$_9$ stand, independently of one another, for a hydrogen atom, a hydroxyl group or an organic residue, with the provisio that at least one of the residues R$_5$, R$_6$, R$_7$, R$_8$ and R$_9$, preferably at least the residue adjacent to the OH-group, is a —C(CH$_3$) residue. Examples of appropriate radical scavengers that can be mentioned in this connection are 2,2'-methylen-bis-(6-tert-butyl-4-ethyl)-phenol, tert-butylhydroxy anisol, tert-butylbrenzcatechin and 4-tert-butylcatechol. In this context it may furthermore be preferred that at least one of the residues R$_5$ and R$_7$ is a hydroxyl group.

In context with this preferred embodiment of the stabilised monomer composition according to the present invention, the radical scavenger may also have a chemical structure comprising at least one structural element having the general formula (VII)

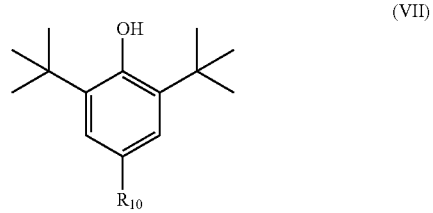

in which R$_{10}$ stands for a hydrogen atom, a hydroxyl group or an organic residue, wherein it is especially preferred that residue R$_{10}$ also comprises a structural element having the general formula (VII). Examples of appropriate radical scavengers that can be mentioned in this context are the products Irganox®076, Irganox®1024 and Irganox®1010, 076 from Ciba AG, Basel, Switzerland, and Tinuvin®1130 from BASF AG, Ludwigshafen, Germany.

In context with this preferred embodiment of the stabilised monomer composition according to the present invention, the radical scavenger may furthermore have a chemical structure comprising at least one structural element having the general formula (VIII)

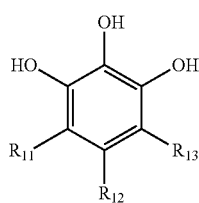

(VIII)

in which $R_{11}$, $R_{12}$ and $R_{13}$ stand, independently of one another, for a hydrogen atom or an organic residue, wherein a hydrogen atom and a $C_1$-$C_{10}$-alkyl residue are especially preferred. Examples of appropriate radical scavengers that can be mentioned in this context are propyl gallate and pyrogallol.

According to a second preferred embodiment of the stabilised monomer composition according to the present invention the stabiliser may be an amine.

According to a preferred embodiment of the stabilised monomer composition according to the present invention, in which the stabiliser is an amine, the stabiliser may have a chemical structure having the general formula (IX)

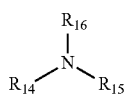

(IX)

in which $R_{14}$, $R_{15}$ and $R_{16}$ stand, independently of one another, for a hydrogen atom, $C_1$-$C_{20}$-alkyl residue or an $C_1$-$C_5$-hydroxyalkyl residue, wherein it may be advantageous, that at least one of the residues $R_{14}$, $R_{15}$ and $R_{16}$ is an $C_1$-$C_5$-hydxoxyalkyl residue. Examples of appropriate radical scavengers that can be mentioned in this context are N-methyldiethanolamine, 2-dimethylaminoethanaol and triethanolamine.

According to a third preferred embodiment of the stabilised monomer composition according to the present invention the stabiliser may be an UV/VIS-absorbent, preferably an UV-absorbent. Examples of appropriate UV/VIS-absorbents that can be mentioned in this context are the products Tinuvin®1130 from Ciba AG, Basel, Switzerland, and Uvinul®DS 49 from BASF AG, Ludwigshafen, Germany.

In accordance with the present invention it is furthermore preferred that the stabiliser is at least partially soluble in the thiophene derivative monomer. A stabiliser is understood to be at least partially soluble in the thiophene derivative monomer if the stabiliser, when combined with the monomer in the relative amount as indicated above, can be completely dissolved in the monomer without the formation of a separate liquid phase or a remaining solid mass.

The thiophene derivatives that have been stabilised according to the present invention tend distinctly less towards changes in the formation of secondary components, such as dimeric or trimeric thiophenes, and therefore have a distinctly higher stability in storage. In their properties they differ significantly from the thiophene derivatives that have not been stabilised in accordance with the present the invention.

The stabilised monomer composition according to the present invention can be contained in a closed container. As containers, bottles, vessels and barrels a preferred. The inner volume of these containers is preferably at least 50 ml, more preferably at least 100 ml and most preferably at least 1000 ml. It is furthermore preferred that the bottle can be closed by means of a screw top. Moreover, the container can be a glass container, a plastic container or a metal container. Furthermore, the container is preferably impermeable for light, preferably for UV-light.

The present invention also relates to a method for the manufacture of a capacitor, preferably an electronic capacitor, comprising
  forming an anode of a valve metal;
  forming a precursor comprising said anode and a dielectric;
  adding an intrinsically conductive polymer on said precursor, wherein said intrinsically conductive polymer is based on the stabilised monomer composition according to the present invention.

In addition to the dielectric and the anode, the precursor may comprise one or more further layers. According to one embodiment of the present invention, application of the monomer according to the invention to the dielectric of the anode can be effected directly or using an adhesion promoter, for example a silane, for example organofunctional silanes or hydrolysates thereof, e.g. 3-glycidoxy-propyltrialkoxysilane, 3-aminopropyltriethoxysilane, 3-mercaptopropyl-trimethoxysilane, 3-methacryloyloxypropyltrimethoxysilane, vinyltrimethoxysilane or octyltriethoxysilane, and/or one or more other functional layers. The intrinsically conductive polymer is preferably than based on the monomer according to the invention if the polymer is formed by polymerizing it from the monomers according to the present invention.

In a first step an anode is formed of a valve metal, wherein a valve metal powder with a' high surface area is compressed and sintered to a porous electrode body. When this is done, an electrical contact wire, preferably of a valve metal, for example tantalum, is typically also compressed into the electrode body. It is alternatively also possible to etch metal foils in order to obtain a porous film. In the case of a wound capacitor, a porous anode film which forms the electrode body and a cathode film are separated by a separator and wound up.

Valve metals are understood within the scope of the invention to denote those metals whose oxide layers do not permit current to flow equally in both directions. When a voltage is applied to the anode the oxide layers of the valve metals prevent the flow of current, whereas when a voltage is applied to the cathode large currents flow that can destroy the oxide layer. Valve metals include Be, Mg, Al, Ge, Si, Sn, Sb, Bi, Ti, Zr, Hf, V, Nb, Ta and W as well as an alloy or compound of at least one of these metals with other elements. The best known examples of valve metals are Al, Ta and Nb. Compounds with comparable properties are those exhibiting metallic conductivity that can be oxidised and whose oxide layers have the properties described hereinbefore. For example NbO exhibits metallic conductivity, but is generally not regarded as a valve metal. Layers of oxidised NbO however exhibit the typical properties of valve metal oxide layers, so that NbO or an alloy or compound of NbO with other elements are typical examples of such compounds with comparable properties.

Consequently the term "oxidisable metal" covers not only metals but also an alloy or compound of a metal with other elements, provided that they exhibit metallic conductivity and can be oxidised.

The present invention accordingly particularly preferably provides a process for the manufacture of capacitors, which is characterised in that the valve metal or the compound with comparable properties is tantalum, niobium, aluminium, titanium, zirconium, hafnium, vanadium, an alloy or compound of at least one of these metals with other elements, NbO or an alloy or compound of NbO with other elements.

In a second step, a precursor comprising said anode and a dielectric is formed.

The dielectric is preferably formed on said anode. The dielectric preferably consists of an oxide of the electrode material or—in the case where this is already an oxide—of a higher oxidised form of the electrode material. The dielectric optionally contains further elements and/or compounds. The oxidisable metals are for example sintered in powder form to form a porous electrode body or a porous structure is impressed on a metallic body. The latter procedure may be carried out for example by etching a film. The porous electrode bodies are for example oxidised in a suitable electrolyte, such as for example phosphoric acid, by applying a voltage such that such a so called "oxidised electrode body" is obtained. The magnitude of this forming voltage depends on the oxide layer thickness to be achieved or on the subsequent application voltage of the capacitor. Preferred voltages are 1 to 300 V, particularly preferably 1 to 80 V.

In a third step of one embodiment of the present invention an intrinsically conductive polymer is added on said precursor, wherein said intrinsically conductive polymer is based on the stabilised monomer composition according to the present invention. In this context it is preferred that said precursor, preferably the dielectric of the precursor, is coated with a solution of stabilised monomer composition according to the present invention and that subsequently said monomer is polymerised, preferably by means of oxidative or electrochemical polymerization, especially preferred by means of oxidative polymerization using appropriate oxidising agents, such that the intrinsically conductive polymer is obtained.

Optionally further layers, for example polymeric outer layer are applied. A coating containing good conducting layers, such as graphite and silver, or a metallic cathode body, serves as electrode for the discharge of the current. Finally the capacitor is contacted and encapsulated.

As oxidising agents there may be used all suitable metal salts known to the person skilled in the art for the oxidative polymerisation of thiophenes.

Metal salts suitable as oxidising agent are metal salts of main group metals or subgroup metals, the latter hereinafter also being termed transition metal salts, of the Periodic System of the Elements. Suitable transition metal salts are in particular salts of an inorganic or organic acid or of an inorganic acid comprising organic radicals, of transition metals such as for example iron(III), copper(II), chromium(VI), cerium(IV), manganese(IV) and manganese(VII) and ruthenium (III).

Preferred transition metal salts are those of iron(III). Conventional iron(III) salts are advantageously inexpensive, readily obtainable and are easy to handle, such as for example iron(III) salts of inorganic acids, such as for example iron(III) halides (e.g. $FeCl_3$) or iron(III) salts of other inorganic acids, such as $Fe(ClO_4)_3$ or $Fe_2(SO_4)_3$, and iron(III) salts of organic acids and of inorganic acids comprising organic radicals.

As iron(III) salts of inorganic acids comprising organic radicals, there may for example be mentioned iron(III) salts of sulfuric acid monoesters of $C_1$-$C_{20}$-alkanols, e.g. the iron (III) salt of lauryl sulfate.

Particularly preferred transition metal salts are those of an organic acid, in particular iron(III) salts of organic acids.

As iron(III) salts of organic acids, the following may for example be mentioned: iron(III) salts of $C_1$-$C_{20}$-alkanesulfonic acids, such as methanesulfonic, ethanesulfonic, propanesulfonic, butanesulfonic or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids such as trifluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid.

Arbitrary mixtures of these aforementioned iron(III) salts of organic acids may also be used as oxidising agent.

The use of iron(III) salts of organic acids and of inorganic acids comprising organic radicals has the great advantage that they do not have a corrosive effect.

Most particularly preferred as metal salts are iron(III) p-toluenesulfonate, iron(III) o-toluenesulfonate or a mixture of iron(III) p-toluenesulfonate and iron(III) o-toluenesulfonate.

Further suitable oxidising agents are peroxo compounds such as peroxodisulfates (persulfates), in particular ammonium and alkali metal peroxodisulfates, such as sodium and potassium peroxodisulfate, or alkali metal perborates—optionally in the presence of catalytic amounts of metal ions such as iron, cobalt, nickel, molybdenum or vanadium ions— as well as transition metal oxides, such as for example manganese dioxide (manganese(IV) oxide) or cerium(IV) oxide.

For the oxidative polymerisation of thiophenes, there are theoretically required 2.25 equivalents of oxidising agent per mole of thiophene (see for example J. Polym. Sc. Part A Polymer Chemistry Vol. 26, p. 1287 (1988)). Smaller or larger amounts of equivalents of oxidising agent may however also be used.

The conducting polymers contained as solid electrolyte in the capacitors produced by the method according to the invention are cationic. In order to compensate the positive charge the cationic conducting polymers require anions as counter-ions.

Counter-ions may be monomeric or polymeric anions, the latter hereinafter being termed polyanions. Polymeric anions may for example be anions of polymeric carboxylic acids, such as polyacrylic acids, polymethacrylic acid or polymaleic acids, or polymeric sulfonic acids, such as polystyrenesulfonic acids and polyvinylsulfonic acids. These polycarboxylic and polysulfonic acids may also be copolymers of vinylcarboxylic acids and vinylsulfonic acids with other polymerisable monomers, such as acrylic acid esters and styrene.

Monomeric anions are preferably used for the solid electrolytes since they more readily penetrate the oxidised electrode body.

The following may for example serve as monomeric anions: monomeric anions of $C_1$-$C_{20}$-alkanesulfonic acids, such as methanesulfonic, ethanesulfonic, propanesulfonic, butanesulfonic or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids such as tritluoroacetic acid or perfluorooctanoic acid, and of aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid, or tetrafluoroborates, hexafluorophosphates, perchlorates, hexafluoroantimonates, hexafluoroarsenates or hexachloroantimonates. The monomeric anions of sulfonic acids are not restricted to those of monosulfonic acids, but may also be anions of disulfonic, trisulfonic or polysulfonic acids, for example of benzenedisulfonic acid or naphthalenedisulfonic acid.

The anions of p-toluenesulfonic acid, methanesulfonic acid or camphorsulfonic acid are preferred.

The counter-anions are added preferably to the oxidizer or the stabilised monomer according to the present invention in the form of their alkali metal salts or as free acids.

The possibly present anions of the oxidising agent that is used may also serve as counter-ions, which means that it is not absolutely essential to add additional counter-ions.

As stated above, the precursor is coated with a solution of the stabilised monomer composition according to present invention, which in some cases can be provided in a solution and in other cases as such. The following organic solvents that are inert under the reaction conditions may in particular be mentioned as solvents for the stabilised monomer according to present invention for the production of conducting polymers and/or oxidising agents and/or counter-ions: aliphatic alcohols such as methanol, ethanol, i-propanol and butanol; aliphatic ketones such as acetone and methyl ethyl ketone; aliphatic carboxylic acid esters such as ethyl acetate and butyl acetate; aromatic hydrocarbons such as toluene and xylene; aliphatic hydrocarbons such as hexane, heptane and cyclohexane; chlorinated hydrocarbons such as dichloromethane and dichloroethane; aliphatic nitriles such as acetonitrile; aliphatic sulfoxides and sulfones such as dimethyl sulfoxide and sulfolane; aliphatic carboxylic acid amides such as methylacetamide, dimethylacetamide and dimethylformamide; aliphatic and araliphatic ethers such as diethyl ether and anisole. In addition water or a mixture of water with the aforementioned organic solvents may also be employed as solvent.

In the method according to the present invention it is further preferred that said adding comprises coating said precursor with a solution of the stabilised monomer composition according to the present invention;

polymerizing said monomer such that the intrinsically conductive polymer is obtained.

The intrinsically conductive polymer to the solid electrolyte can be added to the precursor by polymerisation of the stabilised monomer composition according to the present invention with oxidising agents or by electrochemical polymerisation of the monomer on the precursor. For the polymerisation of the monomer with oxidising agents, monomer and oxidizing agents can be applied as a mixture or successively to the electrode body covered by a dielectric.

The oxidising agents and the stabilised monomer composition according to the present invention may be mixed together in solid and/or liquid form and then applied to the oxidised electrode body anode to from the solid electrolyte layer. One or more solvents is/are however preferably added to the mixtures. As suitable solvents there may be mentioned in particular the solvents already listed above.

Oxidising agents and the stabilised monomer composition according to the present invention can also be applied successively, in some cases in the form of solutions, to the oxidised electrode body for forming the solid electrolyte layer. When the monomer is applied first, it is preferred that the monomer is diluted with a solvent.

As suitable solvents there may be mentioned in particular the solvents already listed above.

The stabilised monomer composition according to the present invention can also be electrochemically polymerized in the oxidised electrode body for forming the solid electrolyte layer.

Oxidative polymerisation is carried out at temperatures from $-10°$ to $300°$ C., preferably $10°$ to $200°$ C., particularly preferably $30°$ to $150°$ C. The duration of the heat treatment depends on the nature of the polymer used for the coating and ranges from 5 seconds up to several hours. Temperature profiles with different temperatures and residence times may also be used for the thermal treatment.

It may be advantageous to wash out the excess oxidising agent and residual salts from the coating using a suitable solvent, preferably water or alcohols. Residual salts are understood in this connection to mean the reduced forms of the oxidising agent and possibly further salts that may be present.

For metal oxide dielectrics, such as for example oxides of valve metals, it may be advantageous to treat the oxide film electrochemically in order to rectify possible defects in the said oxide film and thereby reduce the residual current of the finished capacitor. In this so-called reforming the capacitor body is immersed in an electrolyte and a positive voltage is applied with positive potential to the electrode body. The electric current, which flows from the electrode body over defective sites in the oxide film to the conductive polymer, reforms the oxide film at these sites or destroys the conductivity of the conductive polymer at these defective sites.

Depending on the nature of the oxidised electrode body it may be advantageous to impregnate the oxidised electrode body before and/or after a wash procedure either one, two or several further times with the mixtures of the stabilised monomer composition according to the present invention and oxidising agents or successively with the monomer and oxidising agents in order to achieve thicker polymer layers in the interior of the electrode body. The compositions of the mixtures may in this connection vary. The solid electrolyte may optionally be composed of a multilayer system that comprises a plurality of functional layers.

According to a preferred embodiment of the method for the manufacture of a capacitor it is preferred that the polymerization of the thiophene derivative monomer takes place in the presence of at least a part of the stabiliser. It is furthermore preferred that the monomer has not been pre-treated with an alkaline material, which, after the pre-treatment, has at least partially been removed from the monomer, before the monomer is applied in the form of a solution on the dielectric.

The present invention also relates to a capacitor, preferably an electronic capacitor, that has been manufactures by the method according to the present invention.

The capacitors manufactured in accordance with the invention are outstandingly suitable, owing to their low ESR, for use as a component in electronic circuits, for example as filter capacitors or decoupling capacitors. The use also forms part of the subject-matter of the invention. Preference is given to electronic circuits, as present, for example, in computers (desktops, laptops, servers), in computer peripherals (e.g. PC cards), in portable electronic devices, for example mobile phones, digital cameras or amusement electronics, in devices for amusement electronics, for example in CD/DVD players and computer game consoles, in navigation systems, in telecommunications equipment, in domestic appliances, in voltage supplies or in automotive electronics.

The present invention also relates to the use of the stabilized monomer composition according to the present invention for the manufacture of capacitors, preferably electronic capacitors. In this context preferred stabilised monomers and preferred capacitors are those which have been described above in connection with the stabilised monomer composition according to the present invention and in connection with the capacitors according to the present invention.

The present invention also relates to the use of a radical scavenger as previously defined for stabilising a thiophene derivative monomer as previously defined.

The following Examples serve for exemplary elucidation of the invention and are not to be interpreted as a restriction.

EXAMPLES

Examples 1-15

5 g pure 3,4-ethylendioxythiophen ("EDOT"; Clevios M V2; H.C. Starck Clevios GmbH) were mixed with 1.0% by weight (50 mg) of different stabilisers by stirring at 23° C. in an open beaker. 1 ml of each mixture in a glass beaker was irradiated for 6 hours with UV light, wavelength λ=366 nm, by a high pressure Hg-lamp (DESAGA HP-UVIS; Desaga GmbH, Wiesloch, Grammy). The open samples were not covered by a glass cap and held at a distance of 10 cm between the Hg-lamp and the surface of the sample.

After 6 hours, the samples were analyzed for the EDOT-dimer and EDOT-trimer content by $^1$H-NMR-spectroscopy in $CDCl_3$. The intensity of the single proton absorption at 5.42 ppm (δ), corresponding to position 5 in 2,2',3,3',5,7-hexahydro-5,5'-bithieno[3,4-b][1,4]dioxin ("EDOT-dimer") was used to calculate the EDOT-dimer content. The proton resonance coincides with the absorption of the protons at C-atom 5 and 5" in 2,2',",3,3',3",5,5",7,7"-decahydro-5,5':7,5"-terthieno-[3,4b][1,4]dioxin ("EDOT-trimer"). Because the EDOT-dimer is the main product in the EDOT-dimerization- and trimerization reactions (see EP 1 375 560 B1, H.C. Starck GmbH), and dimer and trimer are not distinguishable by the $^1$H-NMR-absorption at 5.42 ppm, the EDOT reaction products are calculated as dimer. 100 ppm was the detection limit.

The following table 1 shows the results with different stabilisers (example 1-15) and demonstrates the inhibition or decrease of the photochemical dimer formation.

| Example/ Comparative Example | stabiliser | dimer content [ppm] |
| --- | --- | --- |
| A[1] | unstabilised | 240 |
| 1 | Irganox ® 1076 | 140 |
| 2 | Tinuvin ® 765 | n.d.[2] |
| 3 | Tinuvin ® 1130 | n.d. |
| 4 | Tinuvin ® 770 DF | n.d. |
| 5 | Uvinul ® 4050 H | n.d. |
| 6 | N-methyl-diethanolamine | n.d. |
| 7 | 2-dimethylaminoethanol | n.d. |
| 8 | triethanolamine | n.d. |
| 9 | Tinuvin ® 123 | n.d. |
| 10 | Tinuvin ® 292 | n.d. |
| 11 | 4-tert-butylcatechol | n.d. |
| 12 | 2,2'-methylene-bis-(6-tert-butyl-4-ethyl)phenol | n.d. |
| 13 | propyl gallate | n.d. |
| 14 | 3-tert-butyl-4-hydroxyanisole | n.d. |
| 15 | pyrogallol | n.d. |

[1]Comparative Example
[2]n.d. = not detectable

Examples 16-28

The procedure from examples 1-15 was repeated, with the exception that instead of pure EDOT a pre-deteriorated EDOT (after prolonged storage over several years), containing 1490 ppm EDOT-dimer, was used (calculation from $^1$H-NMR, see above). The following table demonstrates the decrease of the additional photochemical dimer formation by different stabilisers:

| Example/ Comparative Example | stabiliser | dimer formation [ppm] |
| --- | --- | --- |
| B[1] | unstabilised | 470 |
| 16 | Irganox ® 1076 | 410 |
| 17 | Tinuvin ® 765 | 380 |
| 18 | Tinuvin ® 1130 | 460 |
| 19 | Tinuvin ® 770 DF | 320 |
| 20 | Uvinul ® 4050 H | 390 |
| 21 | N-methyl-diethanolamine | 270 |
| 22 | 2-dimethylaminoethanol | 20 |
| 23 | triethanolamine | 270 |
| 24 | Tinuvin ® 123 | 370 |
| 25 | Tinuvin ® 292 | 360 |
| 26 | 4-tert-butylcatechol | 270 |
| 27 | 2,2'-methylene-bis-(6-tert-butyl-4-ethyl)phenol | 310 |
| 28 | Irganox ® MD 1024 | 270 |

[1]Comparative Example

Example 29 and Comparative Example C

In this Example a capacitor is formed using the stabilized monomer composition according to the present invention. As Comparative Example C a monomer has been used that was not stabilized according to the present invention.

1. Production of Oxidised Electrode Pellets
   Tantalum powder having a specific capacitance of 48,500 μFV/g (VFI-50 KD, H.C. Starck GmbH) was mixed with camphor as a binder and then compressed with a side press together with a tantalum anode wire of 0.49 mm diameter into porous electrode bodies (anode pellets) of dimension 4.4 mm×3.1 mm×1.0 mm. with a green density of 5.5 g/cm$^3$. The camphor binder was removed by a 90 min heat treatment at 190° C. Then the electrode pellets were sintered for 20 min at 1315° C. The pellets were anodised to 30 V in a phosphoric acid electrolyte of 4300 μS at 85° C. The current density was set to 150 mA per gramm of used tantalum powder. After anodization the pellets were washed at 85° C. for 60 min and then dried.
2. Formation of Polymer Solid Electrolyte
   2.1. A solution was prepared consisting of 1 part by weight of the stabilized monomer composition of Example 4 and 20 parts by weight of a 40 wt. % ethanolic solution of iron(III) p-toluenesulfonate (Clevios C-E, H.C. Starck Clevios GmbH). For Comparative Example C the pure EDOT of Comparative Example A was used.
   2.2. The solutions was used to impregnate 9 anode pellets each. The anode pellets were immersed in this solution with an automatic dip coater at a speed of 0.3 minis and withdrawn form the solution with a speed of 1 mm/s after a soaking time of 60 s. Then the anodes pellets were exposed for 15 minutes at 25° C. to a relative atmospheric humidity of 95%.
   2.3 Then process steps 2.1 and 2.2 were repeated on the anode pellets.
   2.4. Following this the anodes pellets were heat treated for 30 minutes at 50° C. in a drying cabinet. The pellets were then washed for 60 minutes in an aqueous 2% solution of p-toluenesulfonic acid. The anode pellets were re-formed at 30 V for 30 minutes in a aqueous solution of p-toluenesulfonic acid of 4300 μS at 25° C., and then rinsed in distilled water and dried.

2.5 The process steps 2.1 to 2.4 were repeated two times.

3. Formation of Outer Coatings and Electrical Measurement 868 g deionised water, 330 g of an aqueous polystyrene sulphuric acid solution having an average molecular weight of 70,000 and a solids content of 3.8% by weight were placed in a 2-l three-necked flask with stirrer and internal thermometer. The reaction temperature was maintained between 20 and 25° C. 5.1 g 3,4-ethylenedioxythiophene were added while stirring. The solution was stirred for 30 minutes. 0.03 g iron(III) sulphate and 9.5 g sodium persulphate were then added and the solution was stirred for a further 24 hours. Once the reaction has been completed, 100 ml of a strongly acid cation exchanger and 250 ml of a weakly basic anion exchanger were added, for removing inorganic salts, and the solution was stirred for a further two hours. The ion exchanger was filtered out and a poly(3,4-ethylenedioxythiophene)/polystyrene sulphonate dispersion was obtained.

2.5 l demineralised water were placed in a 5-l glass reactor with stirrer and thermometer. 214.2 g p-toluene sulphonic acid monohydrate and 2.25 g iron(III) sulphate heptahydrate were introduced while stirring. Once the entire mixture had dissolved, 85.8 g 3,4-ethylenedioxythiophene were added and stirring was continued for 30 minutes. 192.9 g sodium persulphate were then introduced while stirring, and the mixture was stirred for a further 24 hours at ambient temperature. After the end of the reaction, the PEDT/toluene sulphonate powder was filtered out on a porcelain suction filter, washed with 3 l demineralised water and finally dried for 6 hours at 100° C. 89 g of a bluish black PEDT toluene sulphonate powder were obtained.

In a beaker with stirrer, 170 g of the poly(3,4-ethylenedioxythiophene)/polystyrene sulphonate dispersion, 15 g of a waterbased polyester dispersion, 8 g dimethyl sulphoxide, 1 g 3-glycidoxypropyltrimethoxysilane and 0.4 g of a non-ionic acetylenic-based wetting agent were mixed intensively for one hour. 6 g of the PEDT/toluene sulphonate powder were then dispersed using a bead mill dissolver unit. For this purpose, 300 g of zirconium oxide beads (Ø1 mm) were added and the mixture was stirred at 7000 rpm for one hour, while being cooled with water. Finally, the ground beads were separated via a 0.8 μm sieve.

The anode pellets which were prepared according to section 1 and 2 of this example were then dipped in the so prepared dispersion and subsequently dried for 10 min at 120° C. The dipping into the dispersion was carried out with an automatic dip coater at a speed of 0.15 mm/s. The anode pellets were withdrawn form the dispersion with a speed of 1 mm/s after a soaking time of 10 s.

Afterwards the pellets were dip-coated with a graphite (mixture of 1 part by weight Electrodag PR406 (Acheson) and 3 parts by weight diethylene glycol butyl ether (Aldrich)) and dried for 30 min at 25° C., 30 min at 50° C. and 15 min at 150° C. The pellets were then dip-coated with a silver (Electrodag 503, Acheson) and dried for 15 min at 25° C. and 45 min at 150° C.

The capacitance was determined at 120 Hz and the equivalent series resistance (ESR) at 100 kHz using a LCR meter (Agilent 4284A) with a four-point probe.

The average electrical results of the 9 capacitors are given in Table 1. The standard deviation of the average was 0.5% for capacitance and 1 mΩ for ESR.

| Example/Comparative Example | stabilizer | Capacitance [μF] | ESR [mΩ] |
|---|---|---|---|
| 29 | Tinuvin ® 770 DF | 89 | 22 |
| C | unstabilized | 89 | 25 |

The invention claimed is:

1. A stabilised monomer composition comprising at least 50 wt.-%, based on the total weight of the stabilised monomer composition, 3,4-ethylenedioxythiophene as the monomer and 0.001 to 10 wt. %, based on the total weight of the stabilised monomer composition, of a stabiliser that inhibits the formation of dimeric or trimeric 3,4-ethylenedioxythiophene during storage, wherein the stabiliser is completely dissolved in the monomer without the formation of a separate liquid phase or a remaining solid mass.

2. The stabilised monomer composition according to claim 1, wherein the stabiliser has the general formula (IV)

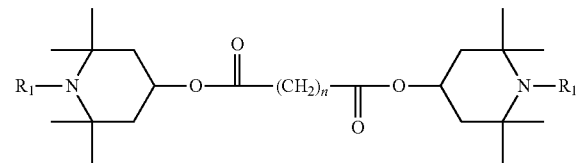

(IV)

in which $R_1$ stands for a hydrogen atom, a hydroxyl group, linear or branched $C_1$-$C_{18}$-alkyl residue or a linear or brached $C_1$-$C_{18}$-alkoxy residue, and n is an integer ranging from 2 to 20.

3. The stabilised monomer composition according to claim 1, wherein the stabiliser has the general formula (V)

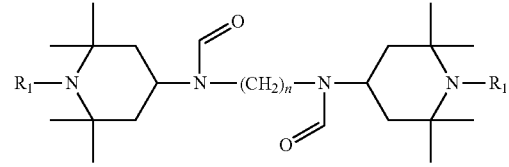

(V)

in which $R_1$ is a linear or branched, optionally substituted $C_1$-$C_{18}$-alkyl residue, an optionally substituted $C_5$-$C_{12}$-cycloalkyl residue, an optionally substituted $C_6$-$C_{14}$-aryl residue, an optionally substituted $C_7$-$C_{18}$-aralkyl residue, an optionally substituted $C_1$-$C_4$-hydroxyalkyl residue, or a hydroxyl residue and n is an integer ranging from 2 to 20.

4. The stabilised monomer composition according to claim 1, wherein the stabiliser has the general formula (VI)

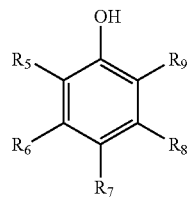

(VI)

in which $R_5$, $R_6$, $R_7$, $R_8$ and $R_9$ stand, independently of one another, for a hydrogen atom, a hydroxyl group or a —$C(CH_3)_3$ residue, with the provisio that at least one of the residues $R_5$, $R_6$, $R_7$, $R_8$ and $R_9$ is a —$C(CH_3)$ residue.

5. The stabilised monomer composition according to claim 4, wherein one of the residues $R_5$ and $R_7$ is a hydroxyl group.

6. The stabilised monomer composition according to claim 4, wherein the stabiliser has the general formula (VII)

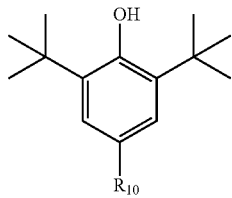

(VII)

in which $R_{10}$ stands for a hydrogen atom or a hydroxyl group.

7. The stabilised monomer composition according to claim 1, wherein the stabiliser has the general formula (VIII)

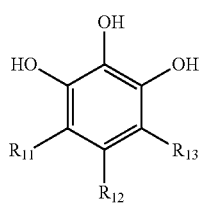

(VIII)

in which $R_{11}$ $R_{12}$ and $R_{13}$ stand for a hydrogen atom or an organic residue.

8. The stabilised monomer composition according to claim 1, wherein the stabiliser has a chemical structure having the general formula (IX)

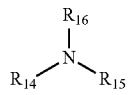

(IX)

in which $R_{14}$, $R_{15}$ and $R_{16}$ stand, independently of one another, for a hydrogen atom, a $C_1$-$C_{20}$-alkyl residue or an $C_1$-$C_5$-hydroxyalkyl residue.

9. The stabilised monomer composition according to claim 1, wherein the stabiliser is an UV/VIS-absorber.

10. A method for the manufacture of a capacitor comprising
forming an anode of a valve metal by compressing and sintering a valve metal into a porous electrode body or by etching metal foils to obtain a porous film;
forming a precursor comprising said anode and a dielectric, wherein the dielectric consists of an oxide of the anode material and wherein the dielectric if formed by oxidizing the porous anode bodies;
coating said precursor with a solution of the monomer according to claim 1;
polymerising said monomer such that the intrinsically conductive polymer is obtained; wherein polymerization of the monomer takes place in the presence the stabiliser.

11. The method of claim 10, wherein the stabilised monomer composition has not been pre-treated with an alkaline material, which, after the pre-treatment, has at least partially been removed from the stabilised monomer composition.

12. The stabilised monomer composition according to claim 1, wherein the stabiliser is selected from the group consisting of Octadecyl-3-(3,5-ditert butyl-4-hydroxyphenyl)-propionate, a mixture of a mixture of bis(1,2,2,6,6-pentamethyl-4-piperidyl)sebacate and methyl 1,2,2,6,6-pentamethyl-4-piperidyl sebacate, [3-1-3-(2-H-Benzotriazole-2-yl)-4-hydroxy-5-tert-butyl-phenyl]-propionic acid-polyethylene glycol) 300-ester, decanedioic acid-bis-(2,2,6,6-tetramethyl-4-piperidinyl)ester, N,N1-Bis(2,2,6,6-tetramethyl-4-piperidyl)-N,N1-diformylhexamethylenediamine, N-methyl-diethanolamine, 2-dimethylaminoethanol, triethanolamine, bis-(1-octyloxy-2,2,6,-tetramethyl-4-piperidyl)-sebacate, a mixture of bis-(1,2,2,6,6-pentamethyl-4-piperidinyl)-sebacate and 1-(methyl)-8-(1,2,2,6,6-pentamethyl-4-piperidinyl)-sebacate, 4-tert-butylcatechol, 2,2'-methylene-bis-(6-tert-butyl-4-ethyl)phenol, propyl gallate, 3-tert-butylhydroxyanisole, pyrogallol and 2',3-bis[[3-[3,5-di-tert-butyl-4-hydroxyphenyl] propionyl]] propionohydrazide.

\* \* \* \* \*